US012625884B2

(12) United States Patent
Woerner et al.

(10) Patent No.: US 12,625,884 B2
(45) Date of Patent: May 12, 2026

(54) NATURAL LANGUAGE PROCESSING FOR BLOCKCHAIN-BASED MANAGEMENT OF MULTI-SOURCE, MULTI-FORMAT BINARY OBJECTS

(71) Applicant: emTRUTH, Inc., Glendale, CA (US)

(72) Inventors: Irene Wong Woerner, Glendale, CA (US); Ronald Chi King Kong, Pasadena, CA (US); Vivian Chow, Pasadena, CA (US)

(73) Assignee: emTRUTH, Inc., Glendale, CA (US)

( * ) Notice: Subject to any disclaimer, the term of this patent is extended or adjusted under 35 U.S.C. 154(b) by 3 days.

(21) Appl. No.: 18/332,509

(22) Filed: Jun. 9, 2023

(65) Prior Publication Data

US 2023/0409604 A1 Dec. 21, 2023

Related U.S. Application Data

(60) Provisional application No. 63/353,774, filed on Jun. 20, 2022.

(51) Int. Cl.
G06F 16/28 (2019.01)
G06F 16/2457 (2019.01)

(52) U.S. Cl.
CPC ...... G06F 16/283 (2019.01); G06F 16/24573 (2019.01); G06F 16/289 (2019.01)

(58) Field of Classification Search
CPC . G06F 16/283; G06F 16/24573; G06F 16/289
See application file for complete search history.

(56) References Cited

U.S. PATENT DOCUMENTS 8,682,885 B2 * 3/2014 Bolotnikoff ....... G06F 16/24544
707/714
10,984,913 B2 * 4/2021 Shah ..................... G06F 16/951
(Continued)

FOREIGN PATENT DOCUMENTS

CN 111008251 A * 4/2020 ......... G06F 16/2219
CN 111369237 A * 7/2020 .......... G06Q 20/382
(Continued)

OTHER PUBLICATIONS

Wang, Hui, Yuanyuan Cen, and Xuefeng Li. "Blockchain router: A cross-chain communication protocol." Proceedings of the 6th international conference on informatics, environment, energy and applications. 2017. (Year: 2017).*

*Primary Examiner* — Neveen Abel Jalil
*Assistant Examiner* — Hubert Cheung
(74) *Attorney, Agent, or Firm* — Womble Bond Dickinson (US) LLP

(57) ABSTRACT

A system and method of blockchain-based data management of multi-source, multi-format data objects. The method including obtaining a plurality of data objects from a plurality of sources in a plurality of formats. The method including storing the plurality of data objects on one or more blockchains in a blockchain format. The method including generating, by a processing device using natural language processing (NLP), one or more keywords for each data object of the plurality of data objects. The method including respectively linking each of a plurality of metadata tags to a single data object of the plurality of data objects on the one or more blockchains, each metadata tag comprising the one or more keywords for the single data object.

16 Claims, 8 Drawing Sheets

700 obtaining a plurality of data objects from a plurality of sources in a plurality of formats
702 storing the plurality of data objects on one or more blockchains in a blockchain format
704 generating, by a processing device using natural language processing (NLP), one or more keywords for each data object of the plurality of data objects
706 respectively linking each of a plurality of metadata tags to a single data object of the plurality of data objects on the one or more blockchains, each metadata tag comprising the one or more keywords for the single data object
708

(56) References Cited

U.S. PATENT DOCUMENTS

| | | | | |
|---|---|---|---|---|
| 2011/0295911 A1* | 12/2011 | DeWoolfson | .......... | G06F 16/289 |
| | | | | 707/E17.044 |
| 2017/0103167 A1* | 4/2017 | Shah | .................... | G06Q 10/101 |
| 2018/0189331 A1* | 7/2018 | Fabijancic | .......... | G06F 16/2282 |
| 2019/0286620 A1* | 9/2019 | Al-Haimi | .............. | G06F 16/211 |
| 2019/0370370 A1* | 12/2019 | Wittern | ............. | G06F 16/24556 |
| 2020/0136799 A1* | 4/2020 | Smith | ..................... | H04L 63/00 |
| 2020/0374296 A1* | 11/2020 | Pack | ........................ | H04L 9/30 |
| 2021/0125725 A1* | 4/2021 | Allen | ..................... | G16H 50/30 |
| 2022/0233959 A1* | 7/2022 | Tsuda | ..................... | A63F 13/56 |
| 2022/0239465 A1* | 7/2022 | Woerner | .................. | H04L 9/50 |
| 2023/0197226 A1* | 6/2023 | Wince | ............... | G06Q 20/3678 |
| | | | | 705/3 |
| 2023/0252233 A1* | 8/2023 | Gutierrez | ................ | G06F 40/40 |
| | | | | 704/9 |

FOREIGN PATENT DOCUMENTS

| | | | | | |
|---|---|---|---|---|---|
| CN | 111651363 A | * | 9/2020 | .......... | G06F 11/3668 |
| CN | 111782727 A | * | 10/2020 | ............ | G06F 16/21 |
| CN | 112511621 A | * | 3/2021 | ............ | H04L 67/10 |
| CN | 112926033 A | * | 6/2021 | ............ | G06Q 40/04 |
| CN | 114064620 A | * | 2/2022 | .......... | G06F 16/287 |
| JP | H0644128 A | * | 2/1994 | | |
| JP | 2023500316 A | * | 1/2023 | | |

* cited by examiner

700

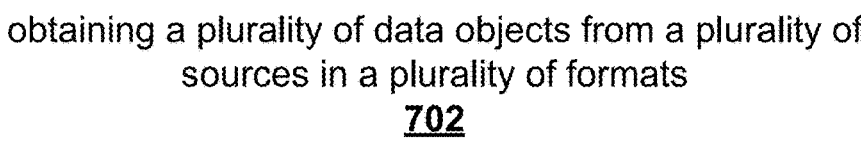

obtaining a plurality of data objects from a plurality of sources in a plurality of formats
702 storing the plurality of data objects on one or more blockchains in a blockchain format
704 generating, by a processing device using natural language processing (NLP), one or more keywords for each data object of the plurality of data objects
706 respectively linking each of a plurality of metadata tags to a single data object of the plurality of data objects on the one or more blockchains, each metadata tag comprising the one or more keywords for the single data object
708

FIG. 7

NATURAL LANGUAGE PROCESSING FOR BLOCKCHAIN-BASED MANAGEMENT OF MULTI-SOURCE, MULTI-FORMAT BINARY OBJECTS

CROSS-REFERENCE TO RELATED APPLICATIONS

This application claims the benefit of U.S. Provisional Application Ser. No. 63/353,774 entitled "NATURAL LANGUAGE PROCESSING FOR BLOCKCHAIN-BASED MANAGEMENT OF MULTI-SOURCE, MULTI-FORMAT BINARY OBJECTS," filed Jun. 20, 2022, the disclosure of which is incorporated herein by reference in its entirety.

TECHNICAL FIELD

The present disclosure relates generally to software technology, and more particularly, to a blockchain-based data management (BDM) system that uses natural language processing (NPL) for blockchain-based management of multi-source, multi-format binary objects.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 7 is a flow diagram depicting a method of using natural language processing (NPL) for blockchain-based management of multi-source, multi-format binary objects, in accordance with some embodiments.

DETAILED DESCRIPTION

Figure 1:
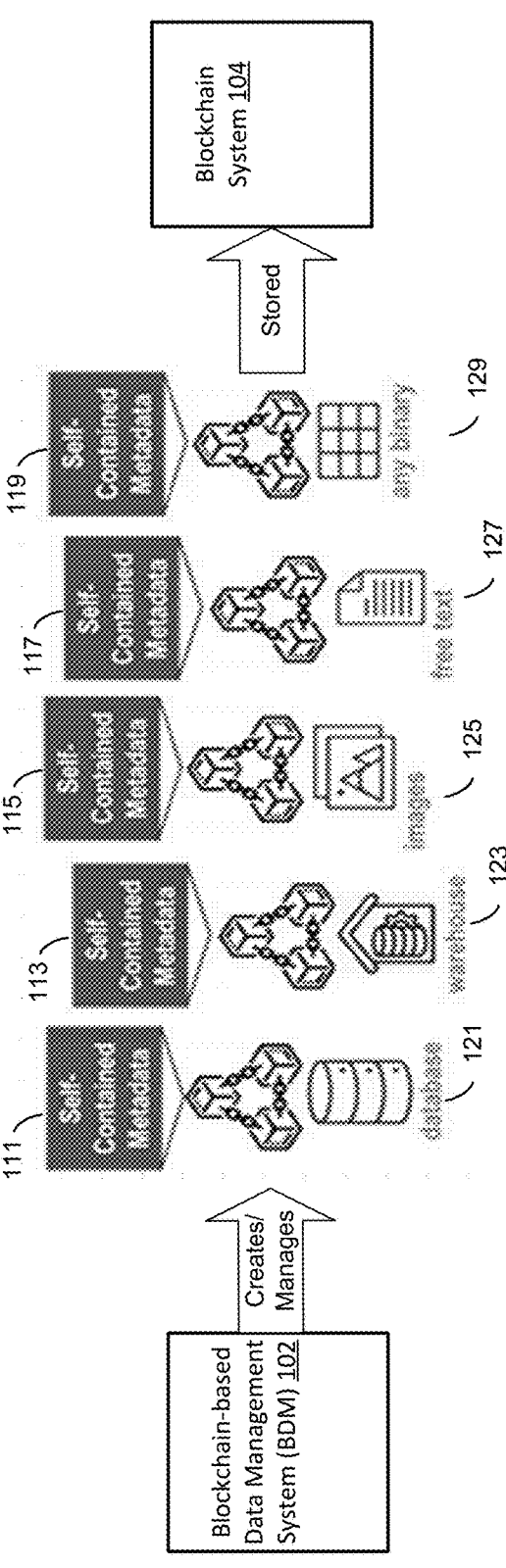
FIG. 1 is a block diagram that illustrates an example environment of distributed data virtualization using blockchain technology and natural language processing (NPL), in accordance with some embodiments of the present disclosure.

The embodiments of the present disclosure were made with government support under 2125909 awarded by the National Science Foundation. The government has certain rights in the embodiments of the present disclosure.

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect can be combined with features from any other embodiment or aspect in any appropriate combination. For example, any individual or collective features of method aspects or embodiments can be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements.

It is time-consuming, labor intensive, and costly to combine data that is in different formats and from different systems (e.g., data sources, servers, clouds, etc.), and nearly impossible for non-technical users. Healthcare organizations, for example, are hindered by internal and external data silos. Healthcare today is multi-system, even for just one patient. For example, there might be a system for their medical record, another system for their imaging data, and so on. Outside a hospital's four walls, securely aggregating and sharing data with other hospitals, doctors or labs becomes exponentially harder and costly. Current approaches require expensive, centralized data warehouses and specialized information technology (IT) professionals when new analytics are needed. Furthermore, value-based healthcare requires nimble integration of data in a myriad of data formats from many systems across multiple organizations. For example, current blockchain solutions are mainly in transactional finance with data block size limits that are too small for healthcare data, such as imaging data. Thus, healthcare organizations want to be data-driven, but information technology (IT) experts currently needed to make sense of multi-system, multi-format data often do not exist or are already overburdened with other demanding tasks.

Aspects of the present disclosure address the above-noted and other deficiencies by providing a blockchain-based data management (BDM) system that uses natural language processing (NPL) for blockchain-based management and secure distribution of multi-source, multi-format binary objects without having to rely on IT intervention. The BDM system enables healthcare users (or any other type of user) to securely combine, share and analyze data of any size or format from many data sources, on demand; thereby allowing health experts to bypass waiting for scarce IT resources.

The BDM system uses blockchain technology and NLP to provide a new, transformative way of aggregating distributed multi-system, multi-format data without compromising data ownership and control. The BDM system transforms (e.g., converts, reformats, normalizes) multi-source data into more granular data building blocks secured in blockchain that can be re-used in different combinations to address different needs (e.g., executive dashboards vs data mining). Beyond cryptographically linking parent-child data blocks in a blockchain, the BDM system enables secure distributed data management of the data blocks.

The BDM system uses NLP to generate (e.g., create, build) one or more keywords for a data object, generate a metadata tag that includes the keywords, and link the metadata tag to the data object to facilitate distributed data virtualization and searching of encrypted raw data. This mechanism enhances a user's ability to easily search and combine distributed data in context with greater relevancy. The embodiments of the present disclosure provide healthcare stakeholders (e.g., healthcare providers, public health, nursing facilities who are disproportionately impacted by COVID-19, etc.) with a faster and easier way to address many healthcare problems, including rapidly evolving COVID-19 questions.

Furthermore, a major benefit of using one or more blockchains to store the data is immutability in a distributed peer-to-peer model for a permanent full data history that includes access. The data history also shows how the BDM system transformed the data into more granular chunks, ensuring full traceability and improving understanding of data used as a basis for actions. Indeed, the societal impact from improved value-based care as a potential result from the embodiments of the present disclosure would be far reaching for every community. Better healthcare, especially during times of pandemic when secure data is critical, impacts everyone.

Moreover, the BDM system of the present disclosure provides innovative tools that aid in meeting a high demand need by unlocking big data potential for end-users with minimal technical expertise and capital investment. The BDM system provides strong proof-of-concept and feasibility data objects (e.g., a data file, an audio file, a video file, etc.) to one or more users—especially in environments where data security is paramount, such as in the healthcare industry, financial industry, educational facilities, retail industry, and/or government/military agencies. The present embodiments demonstrate the viability of using blockchain technology and NLP for on-demand data aggregation and self-contained metadata tagging of distributed data sources by tech-savvy and non-tech-savvy users. Using an Application Programming Interface (API)-first approach, the embodiments of the present disclosure integrate innovations and utilize blockchain analytics (e.g., BlockAPI) for fast-track advancement of core technologies. The BDM system may be configured to provide secure multi-system data aggregation and sharing of data objects in a peer-to-peer (P2P) model. The BDM system may allow non-technical users to make data-driven decisions that are drawn from many disparate big data streams.

The conventional data aggregation system consists of expensive, centralized data warehouses for structured data only, like Teradata and SAP Hana, that require significant upfront capital investments as well as expensive on-going production support; both beyond the reach of many healthcare organizations. This centralized approach also requires data owners to cede data control to whichever organization is operating the data warehouse.

Yet, the BDM system of the present disclosure does not have these same disadvantages. For example, current Layer 2 startups (which use solutions that build on top of Layer 1 of a blockchain network to improve the scalability of the blockchain network) are designed for public transactional applications like cryptocurrency or payment settlement. The embodiments of the present disclosure, however, provide solutions for distributed and secure data management for confidential enterprise solutions in industries where data protection is critical.

In an illustrative embodiment, the blockchain-based data management (BDM) system receives, via a communication network, a plurality of data objects (e.g., a data file, an audio file, a video file, etc.) from a plurality of sources (e.g., servers, database, free form notes, etc.) that are in a plurality of formats (.pdf, .doc, .xlxs, etc.). The BDM system stores the plurality of data objects on one or more blockchains in a blockchain format that is different from each of the plurality of formats. In some embodiments, the BDM system may also store the plurality of data objects in its native format for use and/or traceability as part of data provenance. The BDM system generates (e.g., creates), using natural language processing (NLP), one or more keywords for each data object of the plurality of data objects. The BDM system respectively links (e.g., associates, connects) each of a plurality of metadata tags to a single data object of the plurality of data objects on the one or more blockchains. For example, the BDM system links a first set (e.g., one or more) of metadata tags to a first data object and a second set of metadata tags to a second data object. Each metadata tag includes the one or more keywords for the single data object. In some embodiments, one or more metadata tags may include the same keyword tagging for multiple blockchains that share the same attribute (e.g., gestational diabetes, etc.). Each blockchain may store their separate attributes respectively as metatags.

FIG. 1 is a block diagram that illustrates an example environment 100 of distributed data virtualization using blockchain technology and natural language processing (NPL), in accordance with some embodiments of the present disclosure. The environment 100 includes a blockchain-based data management (BDM) system 102 that creates and manages data blocks that are stored in the blockchain system 104. In some embodiments, the BDM system 102 includes the blockchain system 104. In some embodiments, a blockchain system 104 includes one or more blockchains.

The BDM system 102 uses blockchain technology and NLP to transform multi-system, multi-format data from many organizations into more granular and re-usable data blocks that are immutably secured with unique encryption keys for each individual data block. The BDM system 102 uses NLP to create self-contained metadata tagging accompanying each blockchain in a distributed peer-to-peer model that maintains data ownership and control.

The BDM system 102 creates a self-contained metadata associated with (e.g., sourced from) a data object. For example, the BDM system 102 creates self-contained metadata 101 associated with a first data object of a database 121, self-contained metadata 103 associated with a second data object of a warehouse 123, self-contained metadata 105 associated with a third data object of an image 125, self-contained metadata 107 associated with a fourth data object of free text 127, and self-contained metadata 109 associated with a fifth data object of a binary 129.

The BDM system 102 respectively links each of the self-contained metadata a plurality of metadata tags to a single data object of the plurality of data objects on the one or more blockchains, each metadata tag including the one or more keywords for the single data object.

The BDM system 102 may create a blockchain of any size and/or format, while securely hyperlinking these blockchains for contextual grouping of related data, which something that conventional blockchain systems are unable to do today. The BDM system 102 may provide the hyperlink to another device (e.g., client device) to allow the device to use the hyperlink to access the combined multi-source data, which is combined on-demand.

Conventional systems struggle to manage data that is large-sized and non-transactional. Specifically, the vast majority of existing blockchain technologies are for cryptocurrency or tokenization of small data elements in transactional events like payments and delivery. This limitation in data block size, where data block size and frequency jointly constrain throughput, is currently a barrier to technology advancement for non-transactional needs like secure data management and sharing. Another limitation to current blockchain technology, especially in healthcare, is a lack of focus on protection of sensitive data. Specifically, anonymous access by the public is not appropriate for almost all healthcare data. Healthcare data needs to be protected, with access controlled by each data owner and these actions immutably logged in blockchain.

Advantageously, the BDM system 102 ensures that data ownership and control are addressed by each respective data owner fully controlling use and visibility of their data in blockchain with trusted collaborators as part of a peer-to-peer model. A distributed peer-to-peer blockchain architecture where data can be stored in any authenticated node also reduces potential single points of failure. The BDM system 102 allows an organization, such as a healthcare organization, to maintain ownership and control of their data, which in turn, can significantly reduce the liabilities and risks for the organization that is responsible for the protection and controlled access of the data (e.g., sensitive healthcare data); including reluctant organizations that are hesitant to send and store sensitive data to a central repository controlled and accessible by a third party.

The BDM system 102 is application programming interface (API) driven for iterative research and development. An API may provide RESTful microservices, where REST is Representational State Transfer. In addition to extending performance and functionality of open-source Linux Foundation Hyperledger Fabric, the BDM system 102 provides application layer functionality. The BDM system 102 may be used with lighthouse applications, that are delivered as microservices rather than maintained as separate instantiated code bases.

Figure 2:
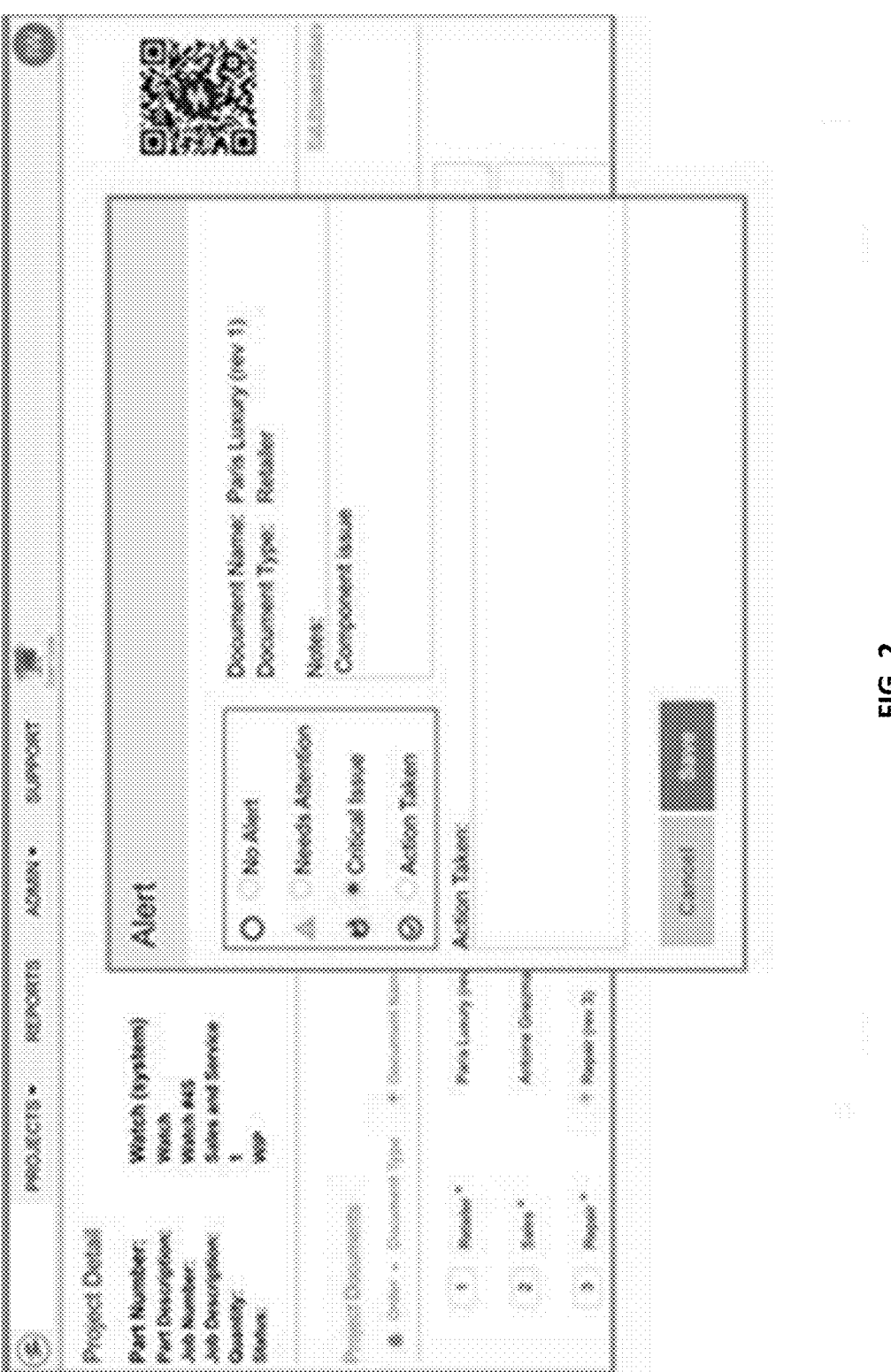
FIG. 2 is a block diagram of an example graphical user interface of an application that provides traceability and distributed change tracking, in accordance with embodiments of the disclosure.

The BDM system 102 may execute an application (e.g., Blocktwin application, or any other type of software application) to provide traceability and distributed change tracking. For example, FIG. 2 is a block diagram of an example graphical user interface of an application 200 that provides traceability and distributed change tracking, in accordance with embodiments of the disclosure. The BDM system 102 may use the application 200 to blockchain data of any size. This provides a viable solution to the healthcare industry which needs to support large digital files of medical data (e.g., Magnetic Resonance Imaging (MRI) images, etc.). The Bitcoin network, for example, cannot address the needs of the healthcare industry because the Bitcoin network restricts the maximum data size (e.g., 10 MB to 15 MB) for a data block.

The BDM system 102 may use the application 200 to generate a hyperlink that combines multiple sets of data together. For example, the BDM system 102 may use the application 200 to generate a hyperlink that combines a first set of data (e.g., medical condition) of a person to a second set of data (e.g., patient identification) of the person. In some embodiments, second set of data may be configured to be hidden to a particular person or entity. The hyperlinked data enables a digital twin of the stored to data, such that the hyperlinked data captures the 'who', 'what', 'where', 'why' and 'how'; not just where (i.e., chain of custody or data provenance).

The BDM system 102 allows data owners to control sharing of their data, down to individual data blocks (e.g., sharing only the latest MRI). In healthcare, for example, sensitive data sharing might be specific and contextual rather than all or nothing.

The BDM system 102 provides security at every layer. For example, the BDM system 102 may support multifactor authentication. As another example, the BDM system 102 may encrypt QR codes with embedded security that tie physical (e.g., a test tube) to digital (e.g., test results) to underlying data secured in blockchain.

The BDM system 102 may incorporate modern cloud-based best practices, deployed in either a secure cloud (e.g., IBM Hyper Protect, AWS GovCloud), a private cloud, or an on-premises solution depending on the user or organization's needs.

Figure 3:
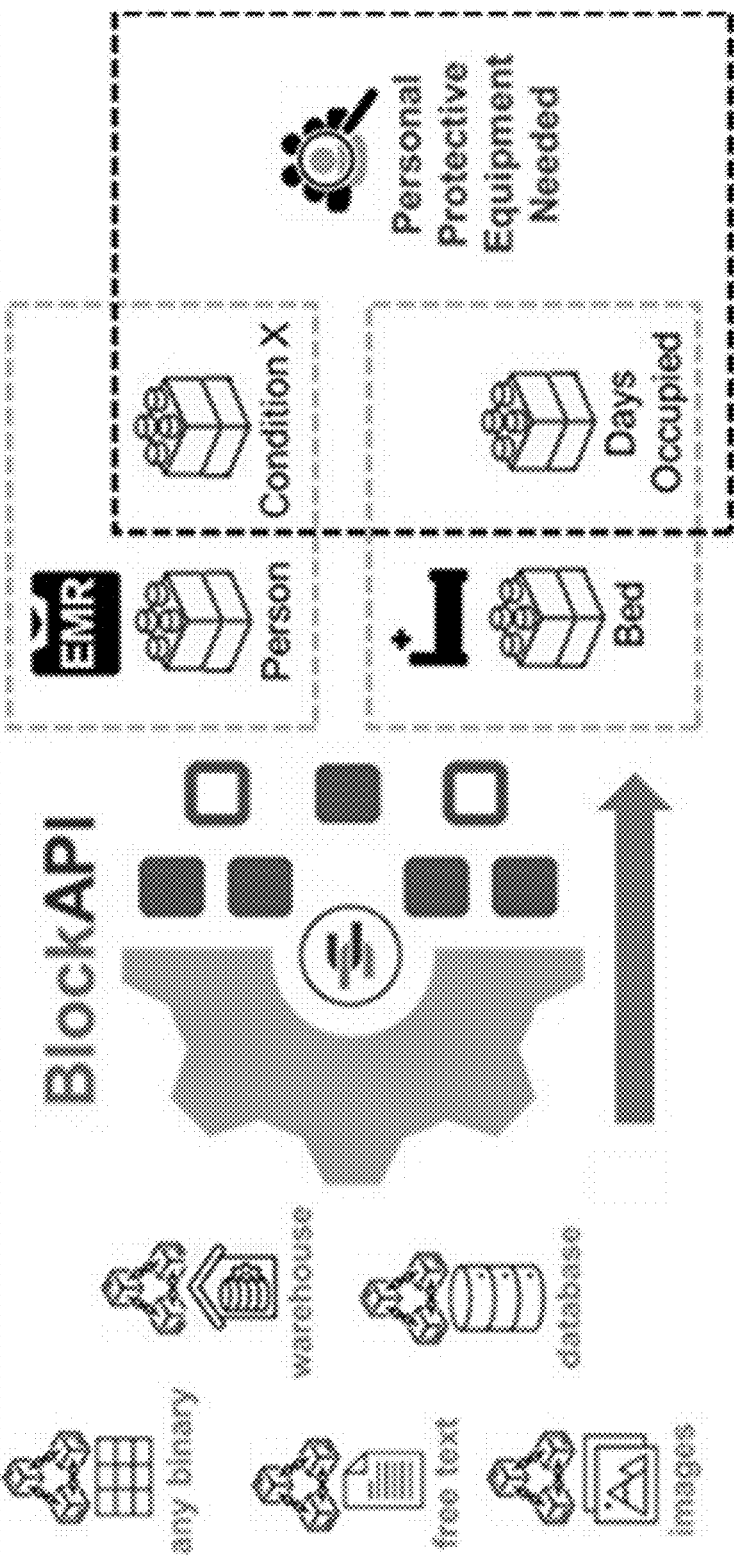
FIG. 3 is a block diagram that illustrates an example transformation of data streams into more granular blockchain data blocks, in accordance with some embodiments of the present disclosure.

FIG. 3 is a block diagram that illustrates an example transformation of data streams into more granular blockchain data blocks, in accordance with some embodiments of the present disclosure. The BDM system 102 may transform (e.g., convert) data into foundational, more-granular data blocks—where each data block may include one or more parts (e.g., or all parts) of a file. Once data is transformed into foundational blockchain building blocks, the data blocks can be re-used repeatedly in different combinations and different ways on-demand. The embodiments of the present disclosure expand blockchain for data management to include data virtualization of distributed data streams from multiple sources and systems. For example, data may be streamed (e.g., or received from) from a data cloud, one or more servers, a database, an edge device, an Internet of Things (IoT) device, a mesh device. Each of these devices and/or databases may execute and/or support one or more blockchains.

Once data is virtualized in blockchain, non-IT users might want an easy way to search for relevant data in the blockchain. However, with much of healthcare data being unstructured, such as free text or images, conventional approaches using structured databases often omit valuable data. The conventional approaches also do not address ownership and control of sensitive data by each respective data owner.

Advantageously, the BDM system 102 uses NLP to assist in identifying metadata tags not only for one centralized database (e.g., an EMR system), but more granular decomposition of one centralized database into more specific, individual data blocks. This approach would be akin to establishing metadata tags not only for an entire structured database, but for each individual record where each record no longer needs to be resident in one centralized system. The BDM system 102 supports structured and unstructured data streams; thereby eliminating the need for a user of the BDM system 102 to be knowledgeable in complex query languages (e.g., SQL).

Metadata tagging, at the individual foundational data block level (e.g., hypertension, critical care treatment), is self-contained within each data block allowing a fully distributed peer-to-peer model. Metadata for each data block enables more granular combinations of data on-demand for higher relevance. For example, sharing just data involving hypertension co-morbidity. Self-contained metadata tags can include meaningful conceptual terms, both as part of a larger data stream and individually as a data block.

Another problem, addressed with the embodiments of the present disclosure is relevance matching when using NLP, which typically ranks results by relevance to a query. Healthcare, for example, has this issue because it involves large amount of mandated regulatory language. However, the BDM system's 102 ability to tag metadata at the data block level significantly increases the relevancy of the data results. Regulatory data, as an example, could exist as separate data blocks with regulatory metadata tags, that could be hyperlinked to relevant clinical data blocks.

Figure 4:
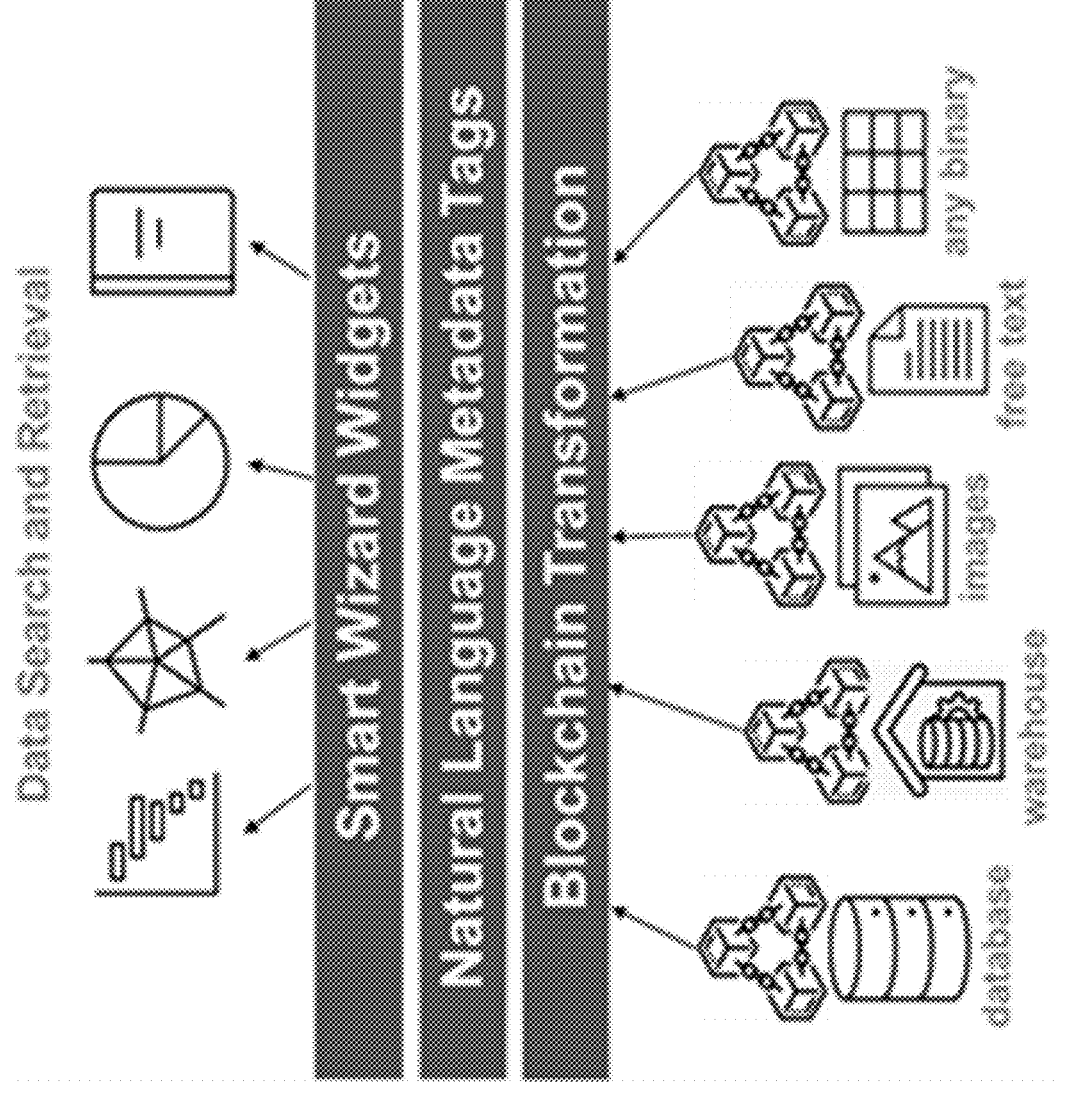
FIG. 4 is a block diagram that illustrates an example high-level approach with the result being a demonstrable prototype that non-IT users can utilize to securely aggregate and share multi-source data on-demand, in accordance with some embodiments of the present disclosure.

FIG. 4 is a block diagram that illustrates an example high-level approach with the result being a demonstrable prototype that non-IT users can utilize to securely aggregate and share multi-source data on-demand, in accordance with some embodiments of the present disclosure. As discussed herein, the BDM system 102 uses blockchain technology and NLP capabilities for on-demand data aggregation and natural language-assisted metadata tagging of disparate, format-agnostic data sets in a distributed peer-to-peer model. The BDM system 102 transform data streams reusable blockchain data blocks. The BDM system 102 creates meaningful (e.g., relevant) NLP-assisted tagging of self-contained metadata. The BDM system 102 provides a smart wizard widget for data search and retrieval. The BDM system 102 may be distributed technical architecture that could scale with integrated blockchain and NLP technologies.

By combining blockchain for data aggregation and NLP for self-contained metadata tagging for each data block will make on-demand combining and securely sharing of multi-source data easier for healthcare users who are not information technology (IT) experts.

The BDM system 102 is configured to support a wide range of data streams. The data streams include multi-system, multi-format and multi-organization data that contain structured and/or unstructured data. Healthcare subject matter experts (SME) are recognized in their respective disciplines and are not IT experts.

Figure 5:
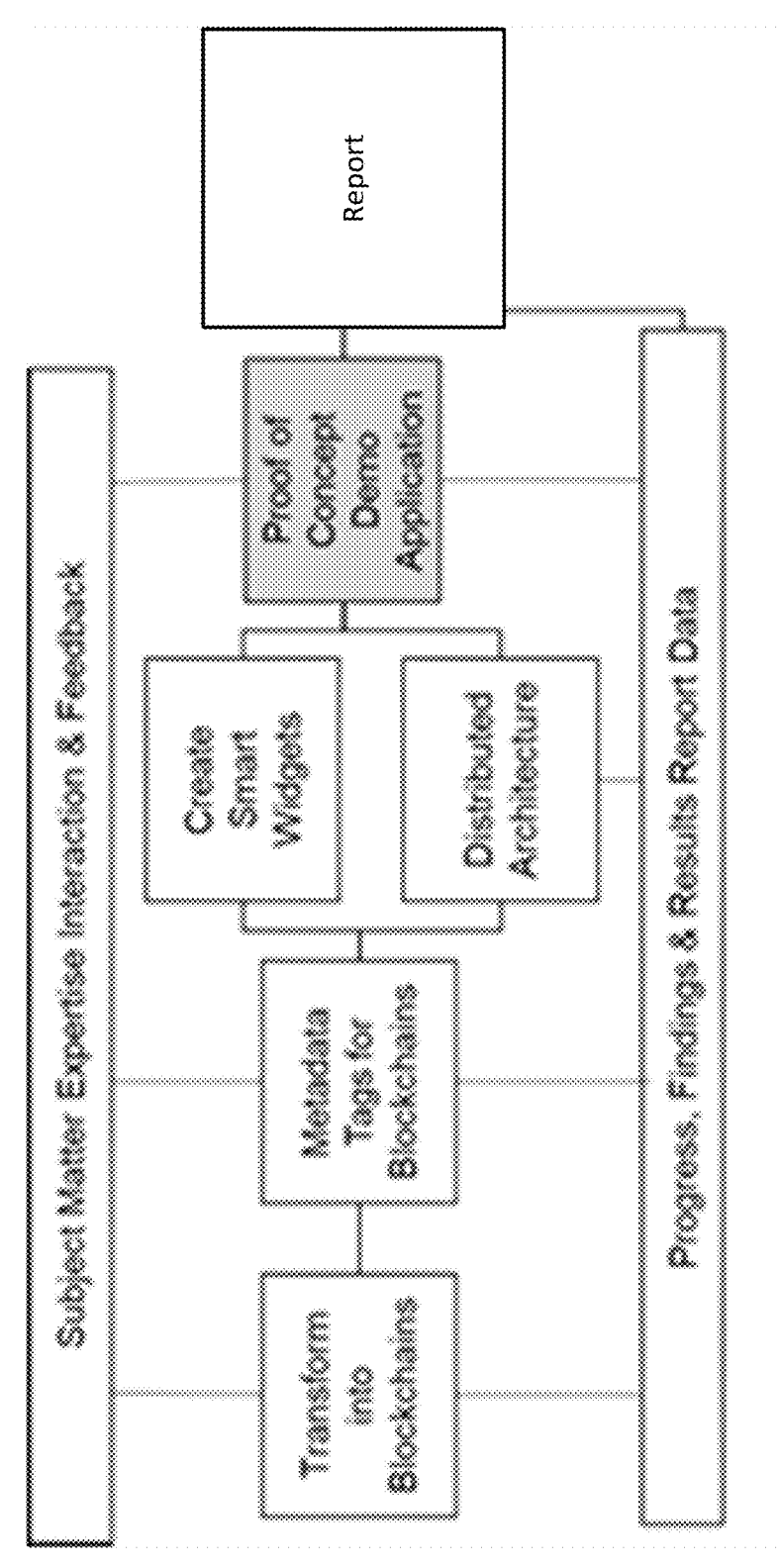
FIG. 5 is a block diagram that illustrates an example flow diagram depicting a method of blockchain-based management of multi-source, multi-format binary objects, in accordance with some embodiments of the present disclosure.

FIG. 5 is a block diagram that illustrates an example flow diagram depicting a method of blockchain-based management of multi-source, multi-format binary objects, in accordance with some embodiments of the present disclosure. Each block in FIG. 5 maps to tasks and subtasks described in greater detail below.

The BDM system 102 may transform multiple data steams into reusable blockchain data blocks for aggregation on-demand. That is, transformation creates more granular re-useable data blocks and offers data protection at the atomic level where each block of data has its own security key that is immutably bound to its parent in a chain of data blocks. APIs may be used to transform the following multi-system multi-format, multi-organization data streams into more granular and re-usable blockchained building blocks.

Data streams (e.g., from data systems, data sources, etc.) may include, for example, the following as representative structured and unstructured data from many organizations in many shapes and sizes for healthcare: global COVID-19 registry using a proprietary data dictionary, Observational Medical Outcomes Partnership (OMOP) Common Data Model for COVID-19 test results, leading institute's proprietary COVID-19 demand planning, public COVID-19 data by county in a state, and geolocation data of healthcare providers. Other types of structured and/or unstructured data may be included.

In some embodiments, programmatically generated data may be used for privacy of real data yet be a realistic representation. Specifically, using real data as a model, variations in the data may be automatically generated as test sample data. For example, additional inclusions of other co-morbidities like diabetes, generated individual patient identifiers and demographics. The global COVID-19 registry characterizes coronavirus intensive care with detailed critical care data from over 40,000 coronavirus patients globally. In some embodiments, the BDM system 102 may use the COVID-19 registry data dictionary as the model to generate test data. Additionally, there are ancillary files, such as MRIs, that can be used to demonstrate capture of related large binary files in blockchain.

By using the global virus registry, an anonymized set of sample data following the registries structured format may be defined, where the set of sample data includes data that represents 1) with hypertension as a co-morbidity, 2) without hypertension as a co-morbidity, 3) with ventilator usage to address conditions like acute respiratory distress syndrome; and 4) without ventilator usage. This includes free text captured as part of the global registry. Data can include anonymized chest MRIs or X-rays in actual image format that are large-sized to hyperlink with COVID-19 and non-COVID-19 sample patient test data as a demonstration of patient data aggregation from multiple sources that are all captured in separate foundational data block blockchains.

In some embodiments, Observational Health Data Sciences and Informatics's (OHDSI) Observational Medical Outcomes Partnership (OMOP) open-source Common Data Model for electronic medical records may be used as another data source. For example, the defined OMOP schemas for test measurements. Capturing in blockchain some of the data structures from complex structured data systems would enable re-aggregation of all transformed data blocks back to an original data stream. It could also prove useful for demonstrating technical feasibility of transformation from commercial systems, such as electronic medical records.

OMOP Measurements data schema and structures for COVID-19 test results include type of test, date of test, results, patient identifier, location and provider. Representative test data will include both positive and negative test results as well as county demographics inferenced from data like patient zip codes. In addition to capturing data in more granular data blocks, the embodiments of the present disclosure may also assess different approaches to maintaining some of the existing data structures for future on-demand use. Possible approaches include capture in blockchain of database schema in a markup language format like XML. Tablespace expressed in XML as example, would be captured in a separate blockchain that is hyperlinked to each granular data block that in aggregate is the original data stream in total. This approach also establishes an approach for future R&D efforts in automatically mapping data to data structures by using existing tablespace and data dictionaries, for future analytics research. For example, the analytics approach needed for executive dashboards is much different from one needed for data mining.

Another useful pandemic data source is data for demand planning, especially for skilled nursing facilities that are disproportionately impacted by COVID-19 for both patients and care providers. Many struggle to meet the increased demand and complexities brought on by this pandemic. Skilled nursing facilities' resilience against COVID-19, for example, could be improved by pooling resources and redistribution based on upcoming needs; such as nurses being allocated to over-burdened facilities from nearby facilities with extra capacity. A powerful tool in identifying the best resource allocation strategy is mathematical optimization models. Mixed-integer optimization models can find the best allocation of resources (e.g., nurses) in multi-facility, multi-day, multi-resource settings while considering a wide range of operational and clinical constraints (e.g., max/min # of nurse per patient per facility).

The BDM system 102 may include an initial optimization model. Input data to the optimization model may include 1) time-series of current and predicted occupancy levels (e.g., demand), 2) time-series of capacity level(s) at each facility (e.g., resources), 3) clinical information (e.g., ratio of nurse/patient), and 4) operational information (e.g., max # of nurses to be relocated) which can be captured in blockchain as another source of relevant COVID-19 data. The output of the model may include time-series of the optimal number of nurses per facility and inter-facility allocations (i.e., where the nurses come from).

Many states have publicly available anonymized and summarized COVID-19 data by county. Some states also have publicly available geolocation data that includes geo-locations of healthcare providers like skilled nursing facilities. Publicly available COVID-19 summaries by county that includes percentages of affected populations by demographics will be captured in blockchains. This data is in different formats as presented by individual counties using different systems. Publicly available geolocation data includes healthcare providers and facilities. Once captured in one or more data blocks, the BDM system 102 may create self-contained metadata tags identifying skilled nursing facilities and healthcare providers for one or more counties (e.g., 5 CA counties) using geolocation data.

The BDM system 102 may combine (e.g., aggregate) these multi-source, multi-format data streams, in an on-demand fashion. For example, a client device may send a request (e.g., access request) to the BDM system 102, where the request is to provide access to data that answers the following question: "How many sets of PPEs should a skilled nursing facility have on hand (e.g., days of supply by facility) for a county seeing a spike in positive COVID-19 test results?" In response, the BDM system 102 may retrieve one or more sets of data from these multi-source, multi-format data streams to answer the question. The BDM system 102 may generate a hyperlink that combines the one or more sets of data into combined data and provide the hyperlink to the client device.

The BDM system 102 may create meaningful NLP-assisted tagging of metadata using semantic analysis of distributed blockchain data. Semantic analysis may use logical structures and grammatical roles, including analysis like parts of speech, of healthcare free text to identify the most relevant elements in text and the topic. The BDM system 102 may also use additional techniques like text clustering to help identify potentially meaningful relationships between different blocks of free text data. Relationships between different concepts in free text, like "hypertension" and "high blood pressure", are captured in a thesaurus of synonyms, curated by healthcare SMEs, to assist future searches by many users. Specifically, user curation and supervised assistance improves relevance rather than relying solely on a more complex fully auto-mated approach based on general language. The BDM system 102 may also use a combination of lemming and stemming techniques and a curated thesaurus (that each organization can customize) to specifically auto-create rel-evant metadata tags that are part of the data blockchain(s).

Supervised NLP results in meaningful tags in self-con-tained metadata that accompany each individual blockchain data blocks to facilitate search. For example, the BDM system 102 may use NLP to correctly identify blockchains that contain individual data records with a specific keyword or phrase (e.g., hypertension as a co-morbidity); individual data records with a particular treatment (e.g., ventilation); individual test result records in a specific geographic loca-tion (e.g., a state, a county, a city, a town, etc.), demographic data records of affected populations in the specific geo-graphic location, and/or organizations (e.g., skilled nursing facilities) in the specific geographic location.

One or more APIs of the BDM system 102 provide a first smart widget (sometimes referred to as, "Search & Discov-ery smart widget") that manually trigger NLP-assisted data block search and discover. The one or more APIs of the BDM system 102 provide a second smart widget (sometimes referred to as, "Thesaurus widget") that enables expansion of thesaurus synonyms by healthcare subject matter experts. The healthcare SMEs may validate relevancy of NLP-assisted metadata tags for underlying data blocks and dem-onstrate feasibility of NLP for more relevant data search and retrieval in a distributed peer-to-peer model for healthcare data. The BDM system 102 application 200 may include a wizard (e.g., tutorial) that provides step-by-step assistance to a user of a client device and help users to search and identify meaningful data. The application 200 may be HTML5 compliant.

The BDM system 102 may calculate the accuracy of NLP-assisted metadata tags by using the elements of a confusion matrix, which contrasts the real sample class against the label assigned by NLP. For example, the BDM system 102 may calculate accuracy as: $(TP+TN)/(TP+TN+FP+FN)$ where TP (True Positive) is a sample of a class A (e.g., hypertension) and NLP assigned the label A; TN (True Negative) is not of a class A, NLP assigned a label different from A; FP (False Positive) is of a class different from A, NLP assigned the A label; and FN (False Negative) is of the A class, NLP assigned a label different from A.

As discussed herein, the present disclosure describes a distributed peer-to-peer technical architecture that integrates blockchain data aggregation and NLP assisted metadata tagging. In addition, the distributed peer-to-peer technical architecture can also scale with integrated blockchain and NLP technologies.

In some embodiments, distributed performance and scal-ability testing of the BDM system 102 may be performed in the cloud and leverage cloud testing capabilities where possible. Specifically, performance and scalability testing may include the following simulated test cases in increments of 50, 100 and 500 concurrent users in a multi-node distrib-uted architecture with programmatically created data blocks and metadata tags to simulate data volume. For anything user-facing, acceptable performance may be defined as between 1-10 seconds, where 1 second is immediate server-side response and within 10 seconds for full user interface rendering. Performance test cases may include the follow-ing: Read/Write access to blockchain data blocks; NPL-assisted tagging of metadata; and/or Data search and retrieval using self-contained metadata tags for individual data blocks.

Blockchain data may be distributed in at least four sepa-rate nodes with data ownership respectively tied to a plu-rality of owners to demonstrate distributed data virtualiza-tion as well as distributed redundancy. The fourth node would show data redundancy while still maintaining sepa-rate data ownership. Such a distributed architecture would demonstrate robustness of distributed design for system resiliency (e.g., no single point of failure, data is not protected by just a single key if a key is compromised) and data ownership. This approach would also demonstrate a distributed data virtualization model that does not negatively impact performance operational systems by direct queries, like electronic medical records.

The BDM system 102 may present (e.g., display on a screen) the application 200 to a user of a client device, where the application includes a wizard (sometimes referred to as, "Search & Discover wizard") that allows the user to easily aggregate selected data into a dataset with its own set of associated metadata for management of resulting different datasets.

A user can use a widget (e.g., Search & Discovery smart wizard) of the application 200 to select meaningful data from one or more sources, systems, and/or data formats. For example, the user can provide a user input to the BDM system 102 via the application 200, where the user input includes one or more keywords. The BDM system 102 can search metadata tags based on the user input, suggest expansion of metadata searching by including thesaurus suggested terms, and/or display metadata tags and expanded thesaurus terms when browsing through all available data. Responsive to the user and/or BDM system 102 selecting a dataset, the BDM system 102 can present another wizard (sometimes referred to as, "Combine wizard") that can create a user-defined dataset (e.g., aggregated data) and metadata tags for this user-defined dataset to facilitate a future search.

For example, a user (e.g., a healthcare SME) may use the widget of the application 200 to search and aggregate the following two datasets from different sources/systems into a user-defined dataset: 1) A first dataset (from a first data source) indicative of older patients with hypertension (e.g., COVID-19 critical care treatments for patients with hypertension as a co-morbidity and percentage of over 65 adults testing positive for COVID-19 in a specific county); and 2) a second dataset (from a second data source) indicative of affected skilled nursing facilities (e.g., COVID-19 test results for a county and potentially affected skilled nursing facilities in that county).

Captured data blocks from data systems 601 and/or the blockchain system 104 are owned by a specific organization or individual. Unless permission is explicitly granted and logged, a computing system (e.g., BDM system 102, a client device, etc.) has no visibility (e.g., read or write) into the underlying data or meta tags.

A data owner can use a widget (sometimes referred to as, smart sharing wizard) of the application 200 to easily enable or disable sharing of their respective data with internal and/or external people and/or organizations. That is, the smart sharing wizard can assist a data owner through the immediate sharing or unsharing of a dataset, which includes the selected data blocks. The BDM system 102 stores, in one or more blockchains, a complete audit trail including anyone who has modified, accessed, and/or shared the data that is associated with the complete audit trail.

For example, a user (e.g., a healthcare SME) may use the widget of the application 200 to share the following data sets into two new aggregated datasets and verified in blockchain access logs, as well as represented users logged into proto-type application: 1) a first dataset indicative of older patients with hypertension (e.g., shared with users representing different stakeholders), and 2) a first dataset indicative of affected skilled nursing facilities (e.g., shared with state level public health, and once shared with public health, the data owner may rescind the sharing rights from public health for a specific state).

Figure 6:
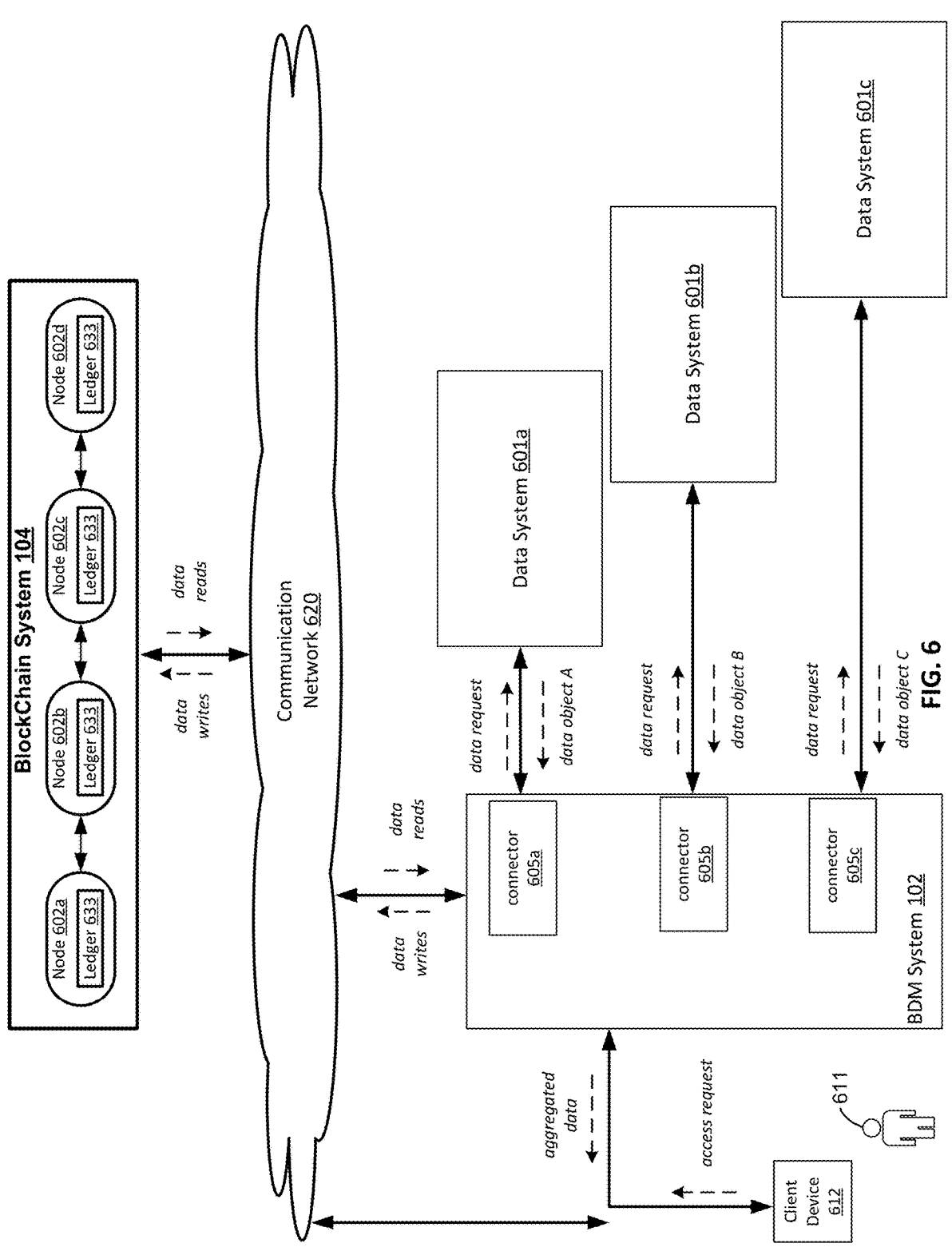
FIG. 6 is a block diagram that illustrates an example environment for using a BDM system for blockchain-based management of multi-source, multi-format binary objects, in accordance with some embodiments of the present disclosure.

FIG. 6 is a block diagram that illustrates an example environment for using a BDM system for blockchain-based management of multi-source, multi-format binary objects, in accordance with some embodiments of the present disclosure. The environment 600 includes a blockchain system 104, a plurality of data systems 601 (e.g., data system 601*a*, data system 601*b*, data system 601*c*), and a client device 612 that are each communicably coupled together via the communication network 620. The BDM system 102 may generate a plurality of connectors 605 (e.g., connector 605, a, 605*b*, 605*c*) that are each respectively associated with the different data systems 601. For example, the BDM system 102 may configure the connector 605 to communicate with data system 601*a*, connector 605 to communicate with data system 601*b*, and connector 605 to communicate with data system 601*c*.

The communication network 620 may be a public network (e.g., the internet), a private network (e.g., a local area network (LAN) or wide area network (WAN)), or a combination thereof. In one embodiment, communication network 620 may include a wired or a wireless infrastructure, which may be provided by one or more wireless communications systems, such as wireless fidelity (Wi-Fi) connectivity to the communication network 620 and/or a wireless carrier system that can be implemented using various data processing equipment, communication towers (e.g., cell towers), etc. The communication network 620 may carry communications (e.g., data, message, packets, frames, etc.) between any other the computing device.

The blockchain system 604 includes nodes 602*a*, 602*b*, 602*c*, and 602*d* (collectively referred to as, "nodes 602") that are communicably connected with one another via a communication network (e.g., same as or different from communication network 620) to form a peer-to-peer network (sometimes referred to as, "distributed ledger technology (DLT) network"). Each of the nodes 602 of the blockchain system 604 use a ledger 633 to record transactions (e.g., transmitting messages, processing messages, results of actions, data blocks, etc.) that are executed in the blockchain system 604. As shown in FIG. 6, each of the nodes 602 store (e.g., includes) a copy of the ledger 633. Each node 602 may broadcast (e.g., transmit, send) a copy of their ledger 633 to one or more of the neighboring nodes in the blockchain system 604 to ensure that each node in the blockchain system 604 may be able to validate the transactions that occur in the blockchain system 604 via a set of consensus rules.

Each ledger 633 (e.g., a distributed ledger) includes a plurality of blocks which are linked together and are secured using cryptographic functions. For example, each block may include a hash (e.g., hash code) of the previous block, a timestamp, and other data (e.g., a copy of the message, a result, etc.). In some embodiments, data in blockchains may include a dataset (e.g., public dataset) that indicates the status (e.g., completion status, progress status, date updated, etc.) that is associated with one or more portions of a service. In some embodiments, blockchains may include a reference to a dataset that indicates the status that is associated with one or more portions of a service, where the dataset can be stored on a database that is separate from the blockchain system 104.

A node 602 may generate a hash using a hash function (e.g., SHA-256), which takes a key as an input that is associated with a datum or record and used to identify it to a data storage and/or retrieval application. The keys may be a fixed length (e.g., an integer), a variable length (e.g., a name), or the datum itself. The output is a hash used to index a hash table holding the data or records, or pointers to them.

A node 602, a data system 601, and the client device 612 may each be any suitable type of computing device or machine that has a processing device, for example, a server computer (e.g., an application server, a catalog server, a communications server, a computing server, a database server, a file server, a game server, a mail server, a media server, a proxy server, a virtual server, a web server), a desktop computer, a laptop computer, a tablet computer, a mobile device, a smartphone, a set-top box, a graphics processing unit (GPU), etc. In some examples, a computing device may include a single machine or may include multiple interconnected machines (e.g., multiple servers configured in a cluster).

A node 602, a data system 601, and the client device 612 may each be one or more virtual environments. In one embodiment, a virtual environment may be a virtual machine (VM) that may execute on a hypervisor which executes on top of an operating system (OS) for a computing device. The hypervisor may manage system sources (including access to hardware devices, such as processing devices, memories, storage devices). The hypervisor may also emulate the hardware (or other physical resources) which may be used by the VMs to execute software/applications. In another embodiment, a virtual environment may be a container that may execute on a container engine which executes on top of the OS for a computing device. For example, a container engine may allow different containers to share the OS of a computing device (e.g., the OS kernel, binaries, libraries, etc.).

The blockchain system 604 may use the same type or different types of virtual environments. For example, all of the nodes 602 of the blockchain system 604 may be VMs. In another example, all of the nodes 602 may be containers. In a further example, some of the nodes 602 may be VMs, other nodes 602 may be containers, and other nodes may be computing devices (or groups of computing devices).

The blockchain system 604 may reach a consensus (e.g., a majority agreement) about the ledger 633 (e.g., the content of the ledger 633 or the content of the entries) using various functions, algorithms, operations, etc. For example, an algorithm may be used by the nodes 602 to reach a consensus if different nodes have different versions of the ledger 633. In another example, the nodes 602 may rotate between each other when creating entries in the ledger 633. For example, after a period of time has passed, a node 602 that has not written to the ledger 133 may be allowed to create an entry in the ledger 633. This may be referred to as a proof of time or a proof of elapsed time system to allow nodes to update the ledger 633.

A node 602 may be a normal node or as a master node. While a normal node and a master node may both be electronic computing devices, a master node (sometimes referred to as, "a super node") may differ from a normal node in that a master node may have more computing resources (e.g., computing power, memory resources, networking bandwidth, storage space, etc.) than a normal node. Next to validating, saving and broadcasting transactions (which are the same operations performed by a normal node), a master node may also facilitate other events in the blockchain system 604 (or in a DLT network), such as governing voting events, providing execution of protocol operations, and enforcing the rules and/or laws of the corresponding blockchain system. Unlike a normal node, a master node may also maintain a constant, active connection with one or more nodes in the blockchain system. As such, a master node, in some embodiments, may consume more resources (e.g., electricity, up-time, maintenance, storage space, memory) than a normal node.

Still referring to FIG. 6, the BDM system 102 receives a request (shown in FIG. 6 as, "access request") from a client device 612 (which is associated with a user 611) for access to data that is associated with one or more search terms. The BDM system 102 uses the search terms to obtain a plurality of data objects from a plurality of sources (e.g., data system 601a, data system 601b, and/or data system 601c) in a plurality of formats. For example, the BDM system 102 may send a request to each of the data systems 601 for data objects associated with the one or more search terms. In response, the BDM system 102 may receive one or more data objects 'A' from data system 601a, one or more data objects 'B' from data system 601b, and one or more data objects 'B' from data system 601b.

The BDM system 102 stores the plurality of data objects on one or more blockchains of the blockchain system 104 in a blockchain format. In some embodiments, the blockchain format is different from each of the plurality of formats. The BDM system 102 generates, using natural language processing (NLP), one or more keywords for each data object of the plurality of data objects. The BDM system 102 respectively links each of a plurality of metadata tags to a single data object of the plurality of data objects on the one or more blockchains. Each metadata tag may include the one or more keywords for the single data object.

In some embodiments, the BDM system 102 may identify, using the plurality of metadata tags, a group of data objects from the one or more blockchains off the blockchain system 104 that are associated with the keyword. The BDM system 102 may provide, responsive to receiving the request, access to the group of data objects to the client device 612.

In some embodiments, a first data object of the group of data objects and a second data object of the group of data objects are obtained from different sources of the plurality of sources. For example, a first data object may be obtained from data system 601a and a second data object may be obtained from data system 601b.

In some embodiments, the BDM system 102 provides, responsive to receiving the request, the access to the group of data objects to the client device 612 by determining a capability of the client device 612 to process data in a target data format. The BDM system 102 may then generate a connector 605 that defines a mapping relationship between the blockchain format and the target data format. The BDM system may transform, using the connector 605, the group of data objects from the blockchain format to the target data format.

In some embodiments, the BDM system 102 transmits the group of data objects (sometimes referred to as, "aggregated data") in the blockchain format to the client device 612. In some embodiments, the BDM system 102 sends a hyperlink to the client device 612, where the hyperlink aggregates one or more sets of data together in an on-demand fashion.

In some embodiments, the BDM system 102 provides, responsive to receiving the request, the access to the group of data objects to the client device 612 by generating access rights indicating that the client device 612 has permission to access the group of data objects. The BDM system 102 may then link (e.g., associate), on the one or more blockchains of the blockchain system 104, access rights to the group of data objects on the one or more blockchains.

In some embodiments, the BDM system 102 receives a request to prevent the client device 612 from accessing the group of data objects. In response, the BDM system 102 updates, on the one or more blockchains of the blockchain system 104, the access rights that are linked to the group of data objects to indicate that the access rights have been revoked.

In some embodiments, the BDM system 102 obtains the plurality of data objects from the plurality of sources (e.g., data systems 601, 601*b*, 601*c*) in the plurality of formats by receiving a first data object of the plurality of data objects in a first format of the plurality of formats and a data dictionary indicative of the first format of the first data object. The BDM system 102 may then generate, using the data dictionary, a connector 605 that defines a mapping relationship between the first format and the blockchain format. The BDM system 102 may transform, using the connector 605, the first data object from the first format to the blockchain format.

In some embodiments, the BDM system 102 may instantiate a data mart from blockchained data because existing business intelligence might be expecting to query with SQL. A data mart may be, for example, a simple form of a data warehouse that uses fewer resources (e.g., processing, memory, database, data sources, etc.) than data warehouses. Instantiating into a data mart may serve one or more purposes. For example, it creates a collection of data specific to a purpose rather than a giant data warehouse trying to be all things to all people. Second, it allows organizations to leverage existing business intelligence (BI) tools that use SQL for data retrieval. In some embodiments, the BDM system 102 may instantiate a data pond (instead of a data mart or data lake) from blockchained data, where the data pond includes only relevant data for a specific purpose.

In some embodiments, the BDM system 102 may configure the data mart (or data pond) to be persistent for on-going use or temporary for one time use. For example, the BDM system 102 may determine that the data mart (or data pond) is no longer being used or predict that the data mart (or data pond) will likely not be used in the near future (e.g., days, weeks, months) and, in response, tear-down (e.g., terminate, destroy) the data mart (or data pond) to preserve resources (e.g., processing, data storage, memory) and/or save power.

An example embodiment for instantiating a data mart is as follows. The BDM system 102 may receive a plurality of data objects from a plurality of sources in a plurality of formats. The BDM system 102 may instantiate a data mart to store the plurality of data objects in a subject-oriented format, the data mart including a plurality of processing resources and at least one storage device. The BDM system 102 may generate, using NLP, one or more keywords for each data object of the plurality of data objects. The BDM system 102 may respectively link each of a plurality of metadata tags to a single data object of the plurality of data objects in the data mart. Each metadata tag may include the one or more keywords for the single data object. In some embodiments, the BDM system 102 identifies distributed blockchain objects by using meta tags, and then groups the distributed blockchain objects. In some embodiments, the BDM system 102 uses a connector 605 to transform the distributed blockchain objects into something consumable by user for a specific purpose, like a data mart.

The blockchain management system may be configured to generate (e.g., create, build) one or more connectors 605. For example, a connector 605 may take data (e.g., from data system 601) that is in a particular data format and transform it into a blockchain format to be stored on a blockchain system 104. As another example, a connector 605 may take data that is stored on the blockchain system 104 in a blockchain format and transform it into a data format that may be useable (e.g., processed, read, etc.) by a target system (e.g., data system 601, client device 612).

In some embodiments, a connector 605 may be created using a JavaScript Object Notation (JSON) like Blockchain Connector Language (BCL). BCL is a human-readable and easy to modify language that describes how data, from source or to target, can be transformed. The BDM system 102 configures the connector 605 to perform the following: (1) maps fields from one source to another (e.g., COVID-19 data dictionary to a first data format, a first data format to OMOP, a first data format to CDISC, a first data format to FHIR), (2) create the underlying blockchains and related organization of the blockchain data, (3) transform values of these field (e.g., normalize date, expected format for a standard, etc.), (4) link related data (i.e., with projects that are groupings of blockchains), and (5) transform blockchain data into something usable by a target system (e.g., data mart for BI tools, data exchange with an electronic medical record expecting FHIR format, etc.)

The present disclosure provides embodiments that transform multiple data streams into reusable blockchain data blocks, enable on-demand aggregation and provide NLP assistance to facilitate search and retrieval of relevant data by non-IT users, with any user facing interactions responding within 1-10 seconds.

FIG. 7 is a flow diagram depicting a method of using natural language processing (NPL) for blockchain-based management of multi-source, multi-format binary objects, in accordance with some embodiments. Method 700 may be performed by processing logic that may include hardware (e.g., circuitry, dedicated logic, programmable logic, a processor, a processing device, a central processing unit (CPU), a system-on-chip (SoC), etc.), software (e.g., instructions and/or an application that is running/executing on a processing device), firmware (e.g., microcode), or a combination thereof. In some embodiments, method 700 may be performed by a blockchain-based data management system (BDM), such as BDM system 102 in FIG. 1.

With reference to FIG. 7, method 700 illustrates example functions used by various embodiments. Although specific function blocks ("blocks") are disclosed in method 700, such blocks are examples. That is, embodiments are well suited to performing various other blocks or variations of the blocks recited in method 700. It is appreciated that the blocks in method 700 may be performed in an order different than presented, and that not all of the blocks in method 700 may be performed.

As shown in FIG. 7, the method 700 includes the block 702 of obtaining a plurality of data objects from a plurality of sources in a plurality of formats. The method 700 includes the block 704 of storing the plurality of data objects on one or more blockchains in a blockchain format. The method 700 includes the block 706 of generating, by a processing device using natural language processing (NLP), one or more keywords for each data object of the plurality of data objects. The method of 700 includes the block 708 of respectively linking each of a plurality of metadata tags to a single data object of the plurality of data objects on the one or more blockchains, each metadata tag comprising the one or more keywords for the single data object.

Figure 8:
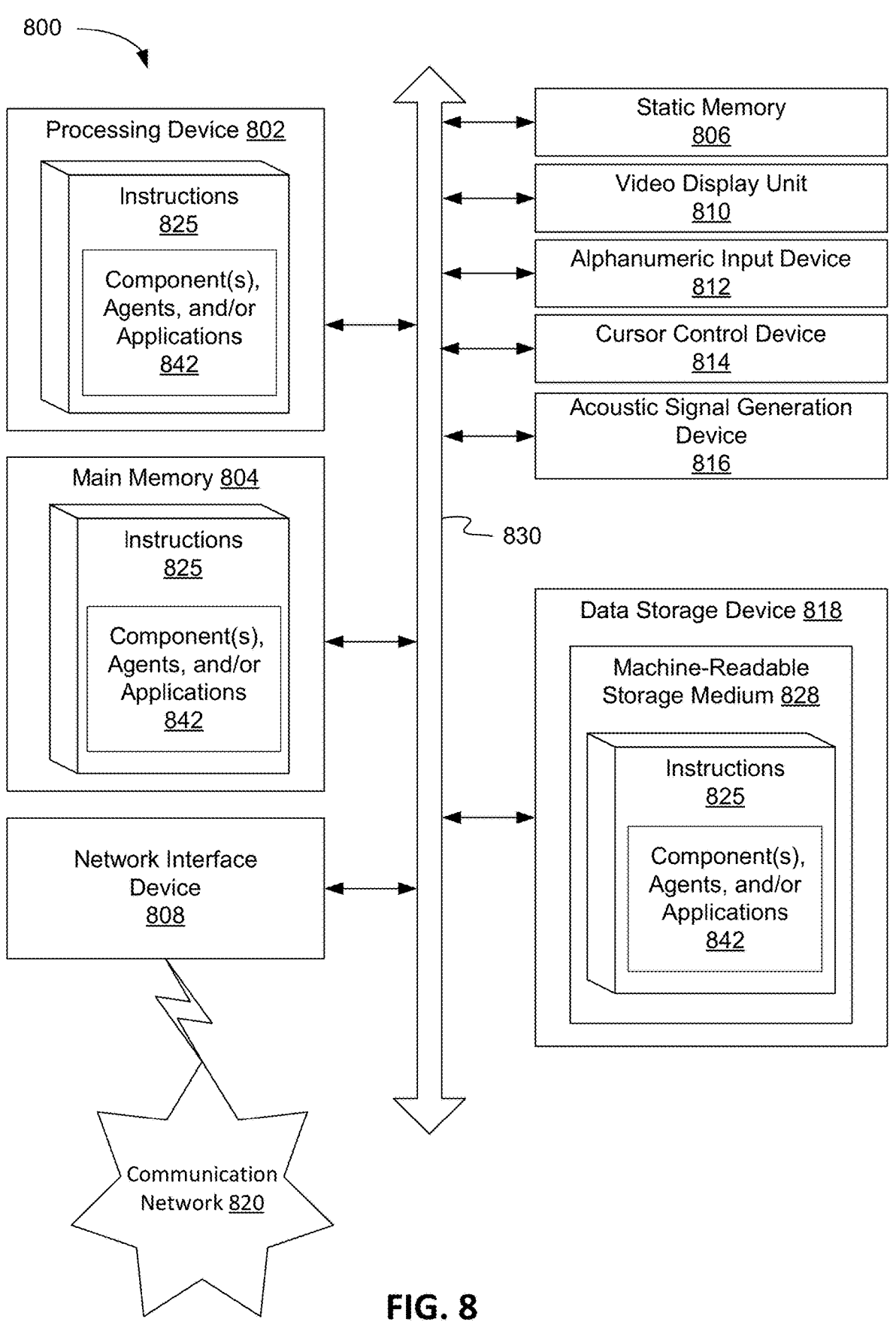
FIG. 8 is a block diagram of an example computing device that may perform one or more of the operations described herein, in accordance with some embodiments.

FIG. 8 is a block diagram of an example computing device 800 (e.g., blockchain management system) that may perform one or more of the operations described herein, in accordance with some embodiments. Computing device 800 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 800 may include a processing device (e.g., a general-purpose processor, a PLD, etc.) 802, a main memory 804 (e.g., synchronous dynamic random-access memory (DRAM), read-only memory (ROM)), a static memory 806 (e.g., flash memory and a data storage device 818), which may communicate with each other via a bus 830.

Processing device 802 may be provided by one or more general-purpose processing devices such as a microprocessor, central processing unit, or the like. In an illustrative example, processing device 802 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 802 may include one or more special-purpose processing devices such as an application specific integrated circuit (ASIC), a field programmable gate array (FPGA), a digital signal processor (DSP), network processor, or the like. The processing device 802 may be configured to execute the operations described herein, in accordance with one or more aspects of the present disclosure, for performing the operations and steps discussed herein.

Computing device 800 may further include a network interface device 808 which may communicate with a communication network 820. The computing device 800 also may include a video display unit 810 (e.g., a liquid crystal display (LCD) or a cathode ray tube (CRT)), an alphanumeric input device 812 (e.g., a keyboard), a cursor control device 814 (e.g., a mouse) and an acoustic signal generation device 816 (e.g., a speaker). In one embodiment, video display unit 810, alphanumeric input device 812, and cursor control device 814 may be combined into a single component or device (e.g., an LCD touch screen).

Data storage device 818 may include a computer-readable storage medium 828 on which may be stored one or more sets of instructions 825 that may include instructions for one or more components (e.g., application 200, blockchain system 104, BDM system 102, etc.) for carrying out the operations described herein, in accordance with one or more aspects of the present disclosure. Instructions 825 may also reside, completely or at least partially, within main memory 804 and/or within processing device 802 during execution thereof by computing device 800, main memory 804 and processing device 802 also constituting computer-readable media. The instructions 825 may further be transmitted or received over a communication network 820 via network interface device 808.

While computer-readable storage medium 828 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "obtaining," "receiving," "storing," "generating," "linking," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein may relate to an apparatus for performing the operations described herein. This apparatus may be specially constructed for the required purposes, or it may include a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. The terms "comprises", "comprising", "includes", and/or "including", when used herein, may specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

In some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times, or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present embodiments to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present embodiments are not to be limited to the details given herein, but may be modified within the scope and equivalents of the appended claims.

What is claimed is:

1. A method of blockchain-based data management of multi-source, multi-format data objects that enables secure combining, sharing and analyzing data of any size or format from many sources on demand, the method comprising:

obtaining a plurality of data objects from a plurality of sources in a plurality of formats;

storing the plurality of data objects on one or more blockchains in a blockchain format;

generating, by a processing device using natural language processing (NLP), a respective set of one or more keywords for each data object of the plurality of data objects based on each data object;

respectively linking each of a plurality of metadata tags to a single data object of the plurality of data objects on the one or more blockchains, each metadata tag comprising the generated respective set of the one or more keywords for the single data object;

determining, by the processing device, a capability of a client device separate from the processing device to read data in a target data format;

generating, based on a data dictionary, a connector that defines a mapping relationship between the blockchain format and the target data format responsive to determining the capability, wherein the data dictionary comprises predefined schema information that defines field mappings and transformation rules for the target data format;

transforming, using the connector, a first data object stored on the one or more blockchains from the blockchain format to the target data format and a second data object stored on the one or more blockchains from the blockchain format to the target data format;

storing, on the one or more blockchains, a reference to the first data object in the target data format and the second data object in the target data format, wherein the reference is configured to aggregate, responsive to an interaction with the reference, the first data object in the target data format and the second data object in the target data format into an aggregated data object for the client device; and storing, on the one or more blockchains, an audit trail indicating which users have shared at least one of the plurality of data objects stored on the one or more blockchains.

2. The method of claim 1, further comprising:

receiving a request to provide access to one or more data objects from the plurality of data objects associated with a keyword;

determining, using the plurality of metadata tags, that the first data object stored on the one or more blockchains is associated with the keyword; and providing, responsive to receiving the request, access to the first data object to the client device.

3. The method of claim 2, wherein the first data object and the second data object are obtained from different sources of the plurality of sources.

4. The method of claim 2, wherein the providing, responsive to receiving the request, the access to the first data object to the client device comprises:

generating access rights indicating that the client device has permission to access the first data object; and linking, on the one or more blockchains, access rights to the first data object.

5. The method of claim 4, further comprising:

receiving a second request to prevent the client device from accessing the first data object; and updating, on the one or more blockchains, the access rights that are linked to the first data object to indicate that the access rights have been revoked.

6. The method of claim 1, further comprising:

transmitting the first data object in the target data format to the client device.

7. The method of claim 1, further comprising:

instantiating a data mart to store at least one of the plurality of data objects or the single data object in a subject-oriented format, the data mart comprising a plurality of processing resources and at least one storage device.

8. A system that enables secure combining, sharing and analyzing data of any size or format from many sources on demand comprising:

a memory; and a processing device of a first service provider, the processing device is operatively coupled to the memory, to:

obtain a plurality of data objects from a plurality of sources in a plurality of formats;

store the plurality of data objects on one or more blockchains in a blockchain format;

generate, using natural language processing (NLP), a respective set of one or more keywords for each data object of the plurality of data objects based on each data object;

respectively link each of a plurality of metadata tags to a single data object of the plurality of data objects on the one or more blockchains, each metadata tag comprising the generated respective set of the one or more keywords for the single data object;

determine a capability of a client device separate from the processing device to read data in a target data format;

generate, based on a data dictionary, a connector that defines a mapping relationship between the blockchain format and the target data format responsive to determining the capability, wherein the data dictionary comprises predefined schema information that defines field mappings and transformation rules for the target data format;

transform, using the connector, a first data object stored on the one or more blockchains from the blockchain format to the target data format and a second data object stored on the one or more blockchains from the blockchain format to the target data format;

store, on the one or more blockchains, a reference to the first data object in the target data format and the second data object in the target data format, wherein the reference is configured to aggregate, responsive to an interaction with the reference, the first data object in the target data format and the second data object in the target data format into an aggregated data object for the client device; and store, on the one or more blockchains, an audit trail indicating which users have shared at least one of the plurality of data objects stored on the one or more blockchains.

9. The system of claim 8, wherein the processing device is further to:

receive a request to provide access to one or more data objects from the plurality of data objects associated with a keyword;

determine, using the plurality of metadata tags, that the first data object stored on the one or more blockchains are associated with the keyword; and provide, responsive to receiving the request, access to the first data object to the client device.

10. The system of claim 9, wherein the first data object and the second data object are obtained from different sources of the plurality of sources.

11. The system of claim 9, wherein to provide, responsive to receiving the request, the access to the first data object to the client device, the processing device is further to:

generate access rights indicating that the client device has permission to access the first data object; and link, on the one or more blockchains, the access rights to the first data object.

12. The system of claim 11, wherein the processing device is further to:

receive a second request to prevent the client device from accessing the first data object.

13. The system of claim 12, wherein the processing device is further to:

update, on the one or more blockchains, the access rights that are linked to the first data object to indicate that the access rights have been revoked.

14. The system of claim 8, wherein the processing device is further to:

transmit the first data object in the target data format to the client device.

15. The system of claim 8, wherein the processing device is further to:

instantiate a data mart to store at least one of the plurality of data objects or the single data object in a subject-oriented format, the data mart comprising a plurality of processing resources and at least one storage device.

16. A non-transitory computer-readable medium storing instructions that enables secure combining, sharing and analyzing data of any size or format from many sources on demand, when executed by a processing device of a first service provider, cause the processing device to:

obtain a plurality of data objects from a plurality of sources in a plurality of formats;

store the plurality of data objects on one or more blockchains in a blockchain format;

generate, by the processing device using natural language processing (NLP), a respective set of one or more keywords for each data object of the plurality of data objects based on each data object;

respectively link each of a plurality of metadata tags to a single data object of the plurality of data objects on the one or more blockchains, each metadata tag comprising the generated respective set of the one or more keywords for the single data object;

determine, by the processing device, a capability of a client device separate from the processing device to read data in a target data format;

generate, based on a data dictionary, a connector that defines a mapping relationship between the blockchain format and the target data format responsive to determining the capability, wherein the data dictionary comprises predefined schema information that defines field mappings and transformation rules for the target data format;

transform, using the connector, a first data object stored on the one or more blockchains from the blockchain format to the target data format and a second data object stored on the one or more blockchains from the blockchain format to the target data format;

store, on the one or more blockchains, a reference to the first data object in the target data format and the second data object in the target data format, wherein the reference is configured to aggregate, responsive to an interaction with the reference, the first data object in the target data format and the second data object in the target data format into an aggregated data object for the client device; and store, on the one or more blockchains, an audit trail indicating which users have shared at least one of the plurality of data objects stored on the one or more blockchains.

* * * * *